US010612725B2

(12) United States Patent
Iwano et al.

(10) Patent No.: US 10,612,725 B2
(45) Date of Patent: Apr. 7, 2020

(54) HIGH-PRESSURE VESSEL

(71) Applicant: TOYOTA JIDOSHA KABUSHIKI KAISHA, Toyota-shi, Aichi-ken (JP)

(72) Inventors: Yoshihiro Iwano, Toyota (JP); Osamu Sawai, Toyota (JP); Motomu Iitsuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/901,492

(22) Filed: Feb. 21, 2018

(65) Prior Publication Data
US 2018/0299073 A1 Oct. 18, 2018

(30) Foreign Application Priority Data

Apr. 18, 2017 (JP) .................................. 2017-082041

(51) Int. Cl.
*F17C 13/06* (2006.01)
*F17C 1/02* (2006.01)
*F17C 1/16* (2006.01)

(52) U.S. Cl.
CPC ................ *F17C 13/06* (2013.01); *F17C 1/02* (2013.01); *F17C 1/16* (2013.01); *F17C 2201/0109* (2013.01); *F17C 2201/0119* (2013.01); *F17C 2203/012* (2013.01); *F17C 2203/0604* (2013.01); *F17C 2203/0619* (2013.01); *F17C 2203/0646* (2013.01); *F17C 2203/0648* (2013.01); *F17C 2203/0663* (2013.01); *F17C 2203/0665* (2013.01); *F17C 2203/0668* (2013.01); *F17C 2205/0305* (2013.01);
(Continued)

(58) Field of Classification Search
CPC .... F17C 13/06; F17C 1/06; F17C 1/16; F17C 1/02; F17C 2203/0604; F17C 2203/0619; F17C 2201/0119
USPC .................................................. 220/589, 581
See application file for complete search history.

(56) References Cited

U.S. PATENT DOCUMENTS

| 4,566,609 A * | 1/1986 | Hoffmeister ............ F02K 9/605 138/31 |
| 5,711,547 A * | 1/1998 | Blumenthal .......... B60R 21/264 222/5 |

(Continued)

FOREIGN PATENT DOCUMENTS

| CN | 1148679 A | 4/1997 |
| JP | 2002-188794 A | 7/2002 |

(Continued)

*Primary Examiner* — Robert Poon
(74) *Attorney, Agent, or Firm* — Oliff PLC

(57) ABSTRACT

A high-pressure vessel includes: a body portion formed in an open cylindrical shape; a cap, at least a part of the cap being inserted inside an opening of at least one end portion of the body portion to thereby plug the end portion; a first reinforcement layer provided at an outer peripheral surface of the body portion and configured by fiber-reinforced plastic having a fiber direction that coincides with a circumferential direction of the body portion; and a second reinforcement layer configured by fiber-reinforced plastic including fibers that pass through a center portion of the cap, as seen in the axial direction of the body portion, and that are disposed parallel to the axial direction of the body portion, as seen in a direction orthogonal to the axial direction of the body portion.

8 Claims, 4 Drawing Sheets

(52) U.S. Cl.
CPC ............ *F17C 2205/0385* (2013.01); *F17C 2205/0394* (2013.01); *F17C 2209/228* (2013.01); *F17C 2221/012* (2013.01); *F17C 2223/0123* (2013.01); *F17C 2223/036* (2013.01); *F17C 2260/011* (2013.01); *F17C 2270/0168* (2013.01); *F17C 2270/0184* (2013.01); *Y02E 60/321* (2013.01)

(56) References Cited

U.S. PATENT DOCUMENTS

| | | | |
|---|---|---|---|
| 5,758,796 A | 6/1998 | Nishimura et al. | |
| 7,887,663 B2* | 2/2011 | Matsuoka | G02B 5/201 |
| | | | 156/230 |
| 9,920,881 B2* | 3/2018 | Nakamura | F17C 1/16 |
| 2002/0088806 A1 | 7/2002 | Takaku et al. | |
| 2010/0206887 A1* | 8/2010 | Hashim | F17C 13/025 |
| | | | 220/581 |
| 2015/0014332 A1* | 1/2015 | Nishibu | F17C 1/02 |
| | | | 220/586 |
| 2015/0192251 A1* | 7/2015 | Tupper | B65D 25/14 |
| | | | 220/589 |
| 2016/0123532 A1* | 5/2016 | Nakamura | F17C 1/16 |
| | | | 220/586 |
| 2017/0254477 A1* | 9/2017 | Schimenti | F17C 1/06 |
| 2018/0195669 A1 | 7/2018 | Sawai | |
| 2018/0299067 A1* | 10/2018 | Swan | F17C 1/06 |

FOREIGN PATENT DOCUMENTS

| | | |
|---|---|---|
| JP | 2010-265931 A | 11/2010 |
| JP | 2018-112201 A | 7/2018 |
| WO | 2017060829 A1 | 4/2017 |

* cited by examiner

HIGH-PRESSURE VESSEL

CROSS-REFERENCE TO RELATED APPLICATION

This application claims priority under 35 USC 119 from Japanese Patent Application No. 2017-082041 filed on Apr. 18, 2017, the disclosure of which is incorporated by reference herein in its entirety.

BACKGROUND

Technical Field

A preferred embodiment relates to a high-pressure vessel.

Related Art

Japanese Patent Application Laid-open (JP-A) No. 2002-188794 discloses a high-pressure hydrogen tank serving as a vessel. The high-pressure hydrogen tank is configured to include a liner formed in a barrel shape and a reinforcement layer wound around the liner and configured by fiber-reinforced plastic. This configuration enhances the rigidity of the liner, so the high-pressure hydrogen tank can hold high-pressure hydrogen inside.

SUMMARY

However, because the high-pressure hydrogen tank disclosed in JP-A No. 2002-188794 is a large tank shaped like a barrel, there are cases where the cabin space and/or luggage space is reduced to install the high-pressure hydrogen tank in a vehicle. That is to say, there is the potential to not be able to efficiently utilize the vehicle space. To address this point, it is conceivable to provide plural small open cylindrical tanks that can be disposed in an empty space in the vehicle. However, in the case of an open cylindrical tank, it is necessary to provide caps to plug both axial direction end portions of the open cylindrical tank, but because of the pressure of the fluid inside the tank, loads arise in the caps in the directions in which the caps detach from the tank body. Consequently, there is room for improvement to improve the pressure resistance of the tank while efficiently utilizing the vehicle space.

In consideration of the above circumstances, an object of a preferred embodiment is to provide a high-pressure vessel that can improve the pressure resistance of the vessel.

A high-pressure vessel pertaining to a first aspect of the disclosure includes: a body portion formed in an open cylindrical shape, with at least one end portion in an axial direction of the body portion being open; a cap, at least part of the cap is inserted inside the opening of the end portion of the body portion to thereby plug the end portion; a first reinforcement layer provided at an outer peripheral surface of the body portion and configured by fiber-reinforced plastic having fiber direction that coincides with a circumferential direction of the body portion; and a second reinforcement layer integrated with the first reinforcement layer and configured by fiber-reinforced plastic including fibers that pass through a center portion of the cap, as seen in the axial direction of the body portion, and that are disposed parallel to the axial direction of the body portion, as seen in a direction orthogonal to the axial direction of the body portion.

According to the high-pressure vessel of the first aspect, the body portion is formed in an open cylindrical shape, at least one end portion of the body portion in the axial direction thereof (hereinafter simply called "the axial direction") is open, and at least part of the cap is inserted inside the end portion to thereby plug the end portion. The first reinforcement layer configured by fiber-reinforced plastic having fiber direction that coincides with the circumferential direction of the body portion is provided at the outer peripheral surface of the body portion. Consequently, the pressure resistance of the body portion in its circumferential direction and radial direction is improved.

Additionally, the second reinforcement layer integrated with the first reinforcement layer is provided. The second reinforcement layer is configured by fiber-reinforced plastic in the same way as the first reinforcement layer, and the fibers of the second reinforcement layer are disposed passing through the center portion of the cap, as seen in the axial direction. Consequently, even in a case where loads outward in the axial direction have been input along the axial direction to the end portions in the axial direction of the body portion, the loads outward in the axial direction can be received uniformly by the second reinforcement layer and the first reinforcement layer integrated with the second reinforcement layer. Furthermore, the fibers of the second reinforcement layer are disposed parallel to the axial direction, as seen in a direction orthogonal to the axial direction. That is to say, the fiber direction of the fibers and the axial direction become the same direction, so loads outward in the axial direction can be more reliably received by the fibers of the second reinforcement layer. For this reason, the pressure resistance in the axial direction of the high-pressure vessel itself can be improved.

A high-pressure vessel of a second aspect of the disclosure is the first aspect, further including a coupling member that is capable of coupling a plurality of caps to each other, and a fastening member, at least a part of each of the plurality of caps being respectively configured to be inserted inside the opening of the at least one end portion of the body portion of each of a plurality high-pressure vessels, wherein a communicative flow path that connects an inside and an outside of the body portion is provided in each cap. A projecting portion that projects outward in the axial direction of the body portion is provided at an outer peripheral side of an end portion that is positioned at an outer end of each cap in the axial direction. A fastening hole is provided inside the projecting portion, with the coupling member being fastened to the projecting portion by the fastening member inserted from an outside into the fastening hole, and a coupling flow path communicated with an outside of the coupling member is provided inside the coupling member, with the communicative flow path in each cap and the coupling flow path in the coupling member being communicated with each other via an inside flow path provided inside the fastening member.

According to the high-pressure vessel of the second aspect, the high-pressure vessel further includes the coupling member that is capable of coupling a plurality of caps to each other, and the fastening member. At least a part of each of the plurality of caps is respectively configured to be inserted inside the opening of the at least one end portion of the body portion of each of a plurality high-pressure vessels. The projecting portion that projects outward in the axial direction is provided at the outer peripheral side of the end portion in the axial direction outer end of each cap. The communicative flow path that connects the inside and the outside of the body portion is provided in each cap, the fastening hole is provided inside the projecting portion of each cap, and the coupling member is fastened as a result of the fastening member being inserted from the outside into the fastening hole. The communicative flow path is communicated, via the inside flow path provided inside the fastening member, with the coupling flow path communicated with the outside of the coupling member. For this reason, the fluid inside the high-pressure vessel can be supplied to the outside via the projecting portion of each cap, and the fluid can be put into the high-pressure vessel from the outside. Consequently, it is not necessary to provide a communicative hole somewhere in each cap outside the projecting portion, so more fibers of the second reinforcement layer can be disposed at the part of each cap positioned other than the projecting portion.

A high-pressure vessel of a third aspect of the disclosure is the second aspect, wherein the projecting portion is provided as a pair of projection portions across the center portion of each cap, as seen in the axial direction of the body portion.

According to the third aspect, the projecting portion is provided as a pair of projection portions across the center portion of each cap, as seen in the axial direction, so the coupling member is fastened to each cap via a pair of the fastening members. Consequently, the rigidity of the attachment of the coupling member to each cap can be improved. Furthermore, the projecting portions are provided on area of each cap positioned outside the center portion, so the fibers of the second reinforcement layer can be disposed so as to pass through the center portion of each cap. Consequently, the fibers of the second reinforcement layer can be prevented from sliding at each cap and no longer catching at each cap as a result of the fibers being disposed passing through area of each cap positioned outside the center portion.

A high-pressure vessel of a fourth aspect of the disclosure is the first aspect, wherein a recess portion that opens toward the inside of the body portion and is recessed outward in the axial direction is formed in the part of the cap inserted inside the body portion.

According to the fourth aspect, the recess portion that opens toward the inside of the body portion and that is recessed outward in the axial direction is formed in the part of the cap inserted inside the body portion. Consequently, the capacity inside the high-pressure vessel can be further increased by the recess portion.

A high-pressure vessel of a fifth aspect of the disclosure is the first aspect, wherein the second reinforcement layer is provided at an outer side of the first reinforcement layer and at an outer surface of the cap.

According to the fifth aspect, the second reinforcement layer is provided at an outer side of the first reinforcement layer and at an outer surface of the cap. Consequently, in a case where loads outward in the axial direction have been input along the axial direction to the end portions in the axial direction of the body portion, the loads can be received reliably by the second reinforcement layer. The pressure resistance in the axial direction of the high-pressure vessel itself can be improved.

A high-pressure vessel of a sixth aspect of the disclosure is the second aspect or the third aspect, wherein the fibers of the second reinforcement layer are wound in an area at the end portion of each cap except an area where the projecting portion is provided.

According to the sixth aspect, the fibers of the second reinforcement layer are wound in an area at the end portion of each cap except an area where the projecting portion is provided. Consequently, in a case where loads outward in the axial direction have been input along the axial direction to the end portions in the axial direction of the body portion, the loads can be received reliably by the second reinforcement layer. The pressure resistance in the axial direction of the high-pressure vessel itself can be improved.

BRIEF DESCRIPTION OF THE DRAWINGS

A preferred embodiment will be described in detail based on the following figures, wherein.

DETAILED DESCRIPTION

An embodiment of the present invention will be described below using FIG. 1 to FIG. 4.

Figure 1:
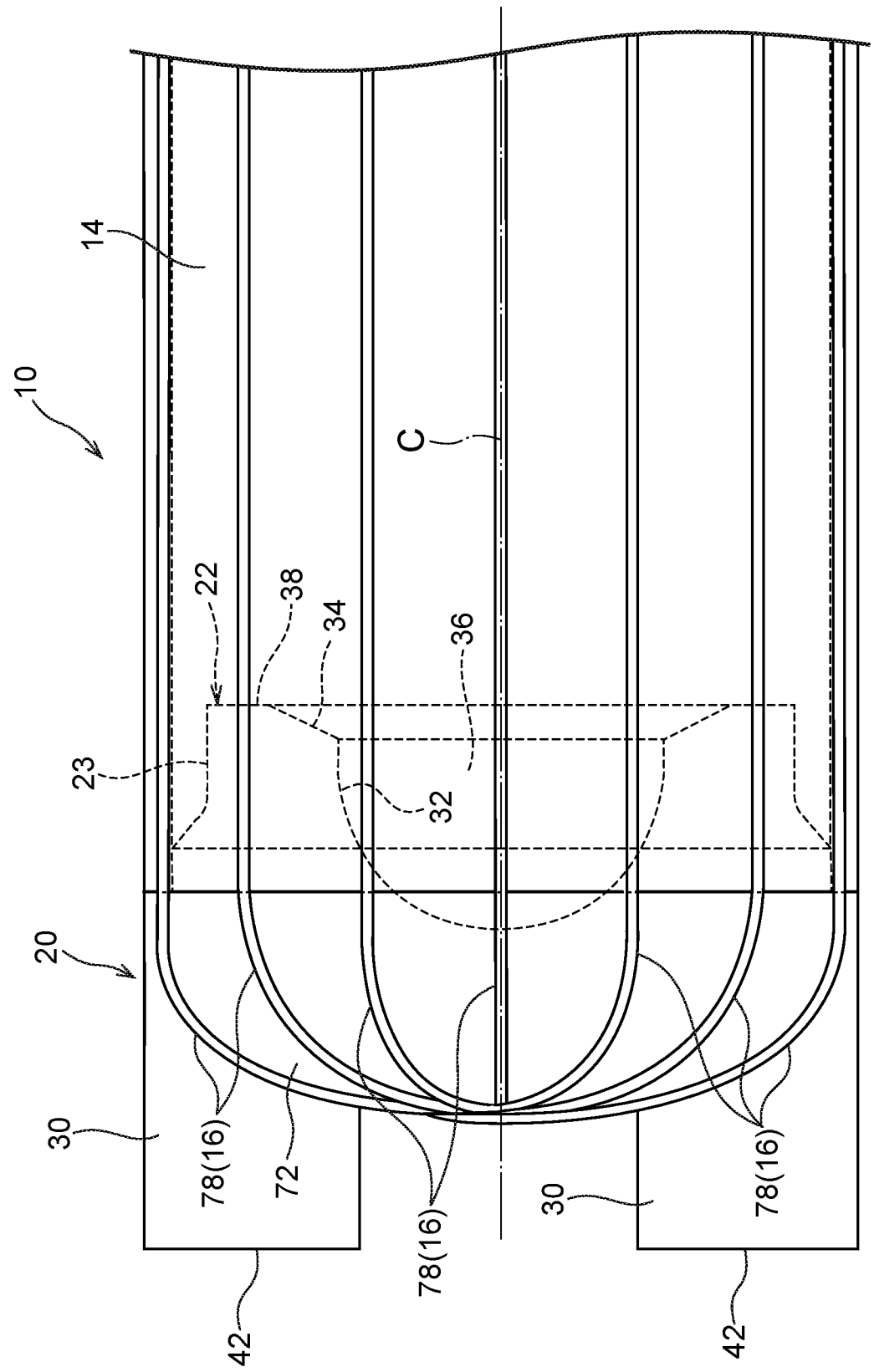
FIG. 1 is a schematic side view showing a high-pressure vessel pertaining to an embodiment of the present disclosure.

A tank module provided in a vehicle not shown in the drawings is configured by combining more than one high-pressure tank 10 serving as a high-pressure vessel shown in FIG. 1. As an example, the tank module has a configuration where the high-pressure tanks 10 are plurally lined up on the vehicle underside of a floor panel (not shown in the drawings) of a fuel cell vehicle and are coupled to each other.

Figure 2:
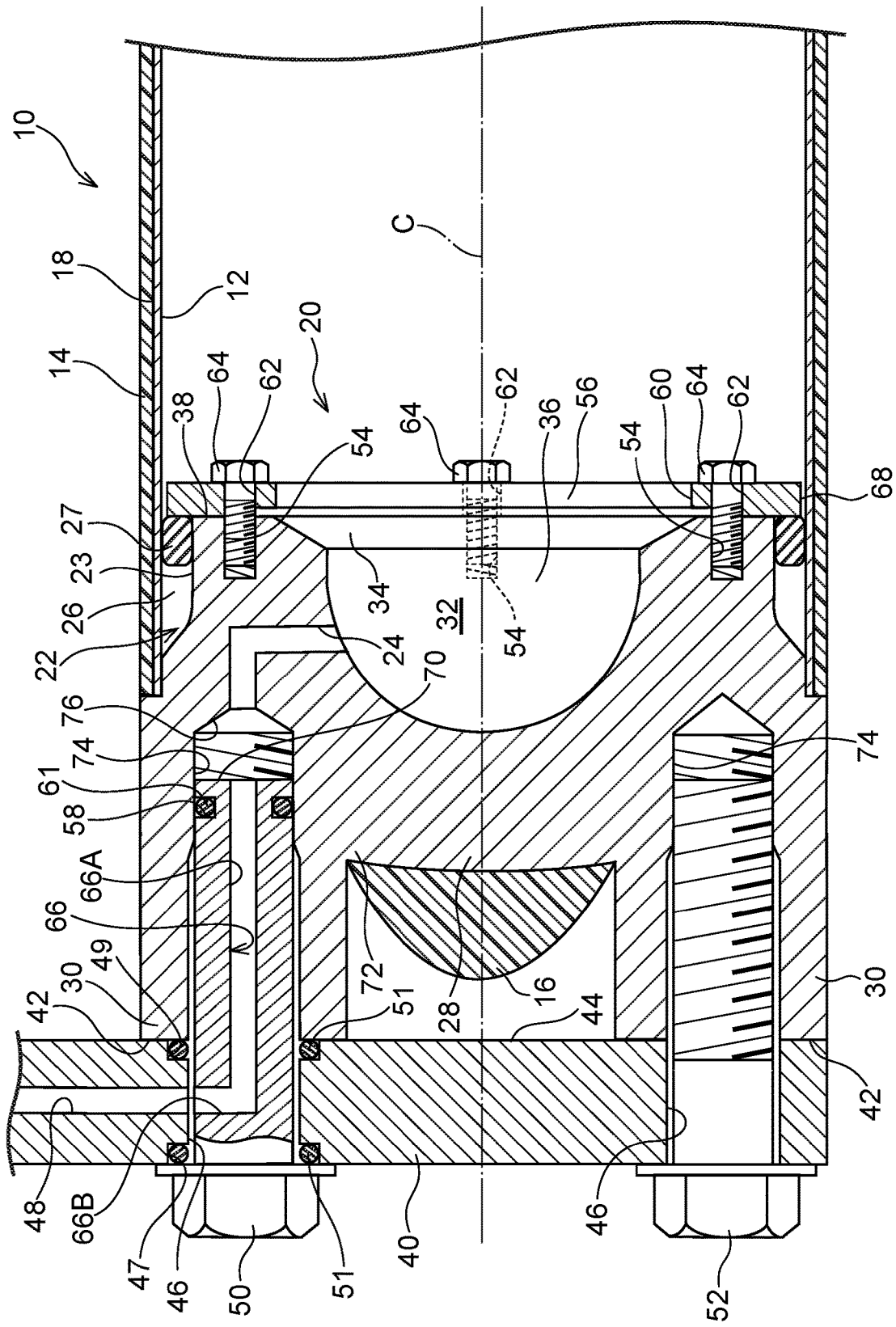
FIG. 2 is an enlarged cross-sectional view showing, as cut along an axial direction, a main section of the high-pressure vessel pertaining to the embodiment.

The high-pressure tanks 10 are respectively formed in a substantially closed cylindrical shape whose axial direction (longitudinal direction) coincides with a vehicle width direction or a vehicle front and rear direction as an example. As shown in FIG. 2, each of the high-pressure tank 10 is configured to include a body portion 12, a first reinforcement layer 14, and a second reinforcement layer 16. The body portion 12 is formed in an open cylindrical shape whose axial direction end portions are open and is configured by aluminum alloy as an example. It will be noted that the body portion 12 has a radial dimension capable of being accommodated in an empty space on the vehicle underside of the floor panel.

A pair of caps 20 are respectively inserted inside a first end portion on one axial direction side and a second end portion on the other axial direction side of the body portion 12 of the high-pressure tank 10. The caps 20 are formed in substantially domed shapes that are convex outward in the axial direction. Each of the caps 20 has a body insertion portion 22 (see FIG. 4), a communicative flow path 24 (see FIG. 2), and projecting portions 30 (see FIG. 4). The body insertion portion 22 is disposed in a position corresponding to the body portion 12, and is formed in a substantially cylindrical shape that projects inward in the axial direction of the body portion 12. The body insertion portion 22 has a later-described recess portion 32 that opens toward an inside of the body portion 12. An outer peripheral surface 23 of the body insertion portion 22 opposes an inner peripheral surface of the body portion 12.

The recess portion 32 provided inside the body insertion portion 22 has a shape that is recessed outward in the axial direction in a state in which the cap 20 is inserted into the body portion 12. The recess portion 32 has a tapered portion 34 and a domed portion 36. The tapered portion 34 is disposed on an end face 38 side of the distal end of the body insertion portion 22 and is formed in such a way that its diameter decreases outward in the axial direction. Furthermore, the domed portion 36 is disposed on the axial direction outer side of the recess portion 32 and is formed in a substantially domed shape. It will be noted that an opening of the communicative flow path 24 is provided at the domed portion 36.

A packing accommodating portion 26 is provided in the body insertion portion 22, and an O-ring 27 is accommodated in the packing accommodating portion 26. The O-ring 27 is in abutting contact with the inner peripheral surface of the body portion 12 as a result of being elastically deformed along the radial direction of the body portion 12.

Figure 4:
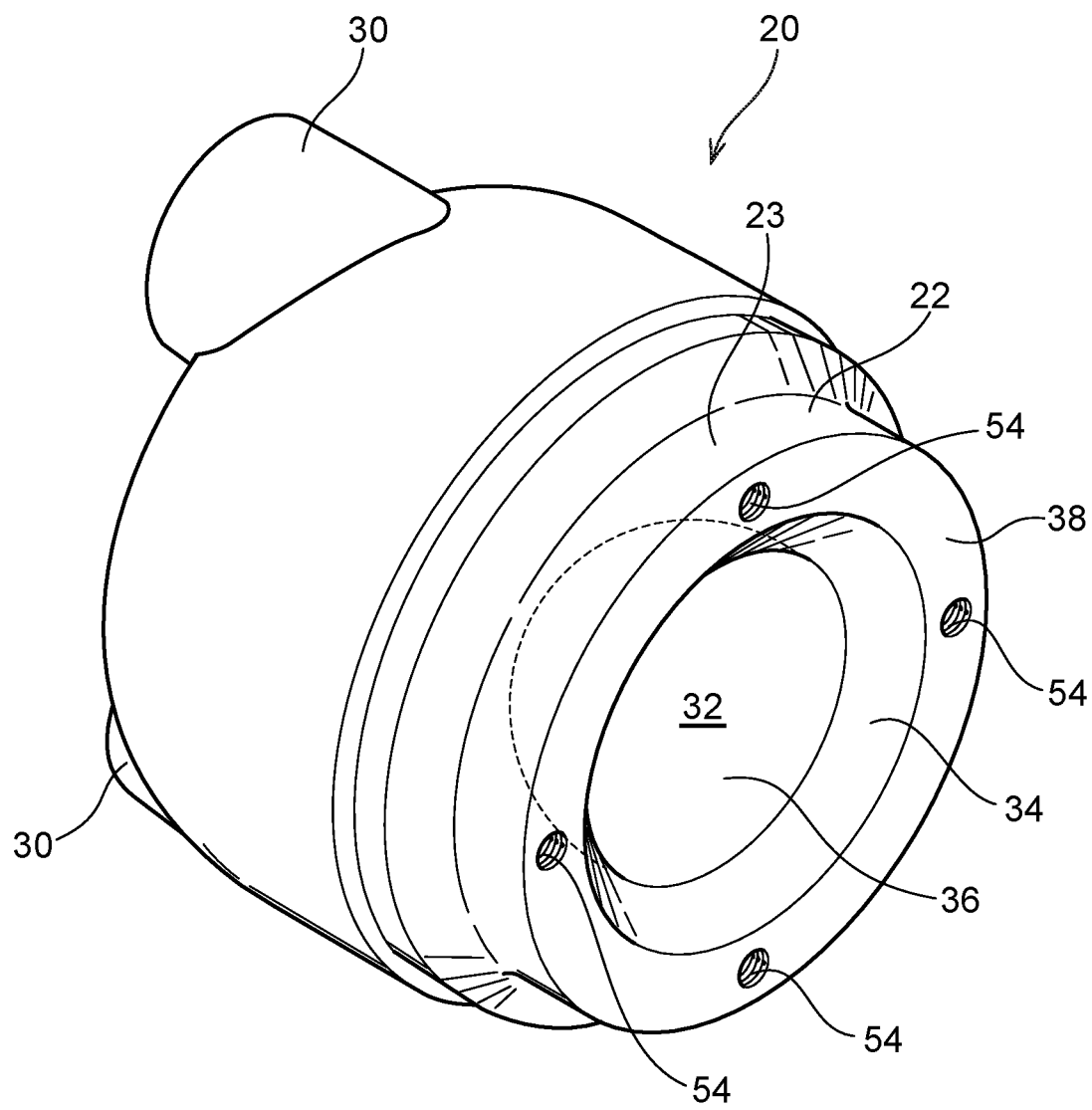
FIG. 4 is a perspective view showing the cap of the high-pressure vessel pertaining to the embodiment as seen from inside in the axial direction.

Plural (in the present embodiment, four as an example) fastening holes 54 are formed at the end face 38 of the body insertion portion 22 (see FIG. 4). Furthermore, a retention plate 56 formed in a disc shape is in abutting contact with the end face 38, and a communicating hole 60 that communicates with the recess portion 32 of the cap 20 is formed at a central portion of the retention plate 56 as seen in the axial direction. Moreover, through holes 62 running through the retention plate 56 in the thickness direction thereof are formed at the retention plate 56 in positions corresponding to the fastening holes 54 at the end face 38 of the cap 20, and bolts 64 are passed through and fastened in the through holes 62 and the fastening holes 54 at the end face 38, whereby the retention plate 56 is attached to the end face 38. It will be noted that the diameter of the retention plate 56 is set to be substantially identical to that of the general portion (the part other than the packing accommodating portion 26) of the body insertion portion 22. That is to say, an outer peripheral surface 68 of the retention plate 56 opposes the inner peripheral surface of the body portion 12. The first end portion on the one axial direction side and the second end portion on the other axial direction side of the body portion 12 are plugged by the body insertion portions 22 of the caps 20 described above.

Figure 3:
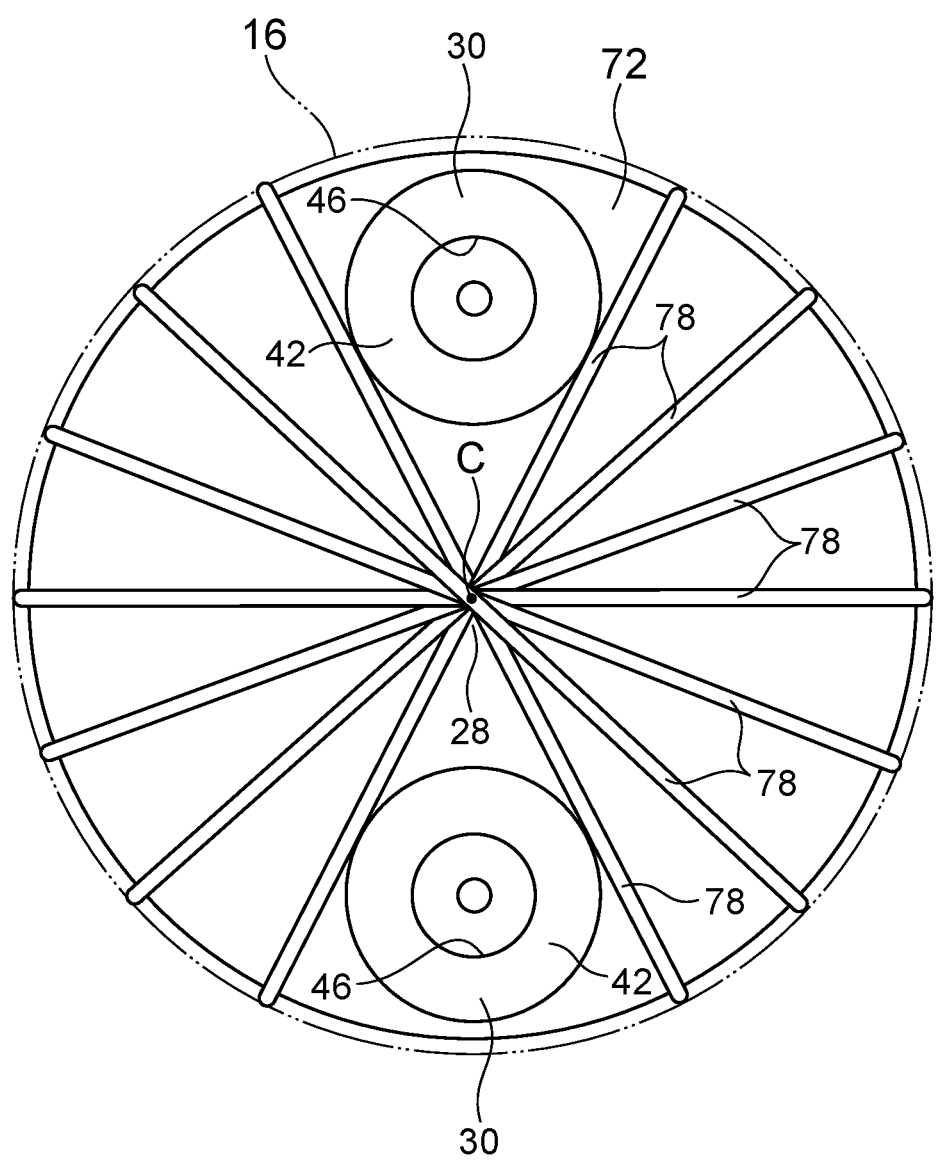
FIG. 3 is a schematic drawing schematically showing, as seen in the axial direction, fibers of a second reinforcement layer at an axial direction outer end portion of a cap of the high-pressure vessel pertaining to the embodiment.

The projecting portions 30 are provided at an outer peripheral side of an outer end portion 72 in the axial direction of the cap 20 which has been inserted in the body portion 12. Specifically, as shown in FIG. 3, the projecting portions 30 are provided as a pair across a center portion 28, that corresponds to an axis C, at the outer end portion 72 of the cap 20 as seen in the axial direction. As shown in FIG. 2, each projecting portion 30 is formed in a closed cylindrical shape that projects outward in the axial direction. Inside the projecting portions 30 are formed fastening holes 74 having threaded portions formed in their inner peripheral surfaces, and an opening of the communicative flow path 24 is provided at a bottom portion 76 of the fastening hole 74 in one of the projecting portions 30.

The communicative flow path 24 is formed inside the cap 20. The communicative flow path 24 is formed in an L-shape inside the body insertion portion 22 and connects the inside and outside of the body portion 12 of the high-pressure tank 10.

A coupling member 40 is fastened to the projecting portions 30 of the cap 20. The coupling member 40 is formed substantially in a shape of a plate made of metal as an example, and an end face 44 of the coupling member 40 on one side in the thickness direction of the coupling member 40 is in abutting contact with an outer end faces 42 in the axial direction of the projecting portions 30 of the plurally lined up high-pressure tanks 10. Furthermore, through holes 46 running through the coupling member 40 in the thickness direction thereof are formed in the coupling member 40 in positions corresponding to the fastening holes 74 in the projecting portions 30. It will be noted that more than one coupling flow path 48 extending along a direction orthogonal to the thickness direction of the coupling member 40 are formed inside the coupling member 40. Specifically, one opening of the coupling flow path 48 is provided at a side surface of the through hole 46. Furthermore, the other opening of the coupling flow path 48 is provided at a side surface of another through hole 46 formed at the coupling member 40 in correspondence to a fastening hole 74 at which is provided a communicative flow path 24 in another adjacent high-pressure tank 10 not shown in the drawings. It will be noted that an opening of the coupling flow path 48 provided at an end portion of the coupling member 40 is open to the outside of the coupling member 40.

The coupling member 40 and the cap 20 are fastened to each other by bolts 50 and 52 serving as fastening members that are inserted and screwed into the through holes 46 in the coupling member 40 and the fastening holes 74 in the projecting portions 30 of the cap 20. In the through hole 46 of the coupling member 40, that corresponds to the fastening hole 74 in which is formed the communicative flow path 24, O-ring accommodating portions 47 and 49 are formed. O-ring accommodating portions 47 and 49 are cut out formed outwardly in an radial direction of the through hole 46 and are disposed at an outer side and an inner side in the axial direction of the through hole 46. O-rings 51 are accommodated inside the O-ring accommodating portions 47 and 49, and the O-rings 51 are in abutting contact with threads (not shown in the drawings) of the bolts 50 as a result of becoming elastically deformed along the radial direction of the through hole 46.

Furthermore, an O-ring accommodating portion 58 formed in a shape recessed inwardly in a radial direction of the bolt 50 is formed in a distal end portion of the bolt 50 screwed into the fastening hole 74 in which the communicative flow path 24 is formed. An O-ring 61 is accommodated inside the O-ring accommodating portion 58, and the O-ring 61 is in abutting contact with the inner peripheral surface of the fastening hole 74 as a result of becoming elastically deformed along the radial direction of the bolt 50.

An inside flow path 66 is formed inside the bolt 50. The inside flow path 66 is formed by an axial direction flow path 66A communicated along the axial direction of the bolt 50 and a radial direction flow path 66B communicated along the radial direction of the bolt 50. The axial direction flow path 66A has an opening in a central portion of a bottom surface 70 of the bolt 50. Furthermore, the radial direction flow path 66B has an opening in a position in an outer peripheral surface of the bolt 50 corresponding to the coupling flow path 48 in the coupling member 40. Consequently, the fluid inside the high-pressure tank 10 can flow from the communicative flow path 24 in the cap 20 via the inside flow path 66 in the bolt 50 to the coupling flow path 48 in the coupling member 40. The communicative flow path 24, the inside flow path 66 in the bolt 50, and the coupling flow path 48 having the configurations described above communicate the insides of the plural high-pressure tanks 10 to each other and further communicate to the outside of the coupling member 40. It will be noted that the fluid that flows from the opening of the radial direction flow path 66B in the bolt 50 is capable of flowing toward the coupling flow path 48 in the coupling member 40 while flowing along the spaces between the threads (not shown in the drawings) of the bolt 50, so the opening of the radial direction flow path 66B and the opening of the coupling flow path 48 do not invariably need to be in corresponding positions.

A valve not shown in the drawings is provided in the coupling flow path 48 in the coupling member 40, and the valve can control the volume of the fluid flowing in the coupling flow path 48. Additionally, the coupling flow path 48 is connected to a fuel cell stack or the like not shown in the drawings.

Next, the first reinforcement layer 14 of the high-pressure tank 10 is a carbon fiber-reinforced plastic (CFRP) sheet and is wrapped around an outer peripheral surface 18 of the body portion 12. Inside the first reinforcement layer 14, carbon fibers not shown in the drawings are arrayed along the circumferential direction of the body portion 12. In other words, the fiber direction of the first reinforcement layer 14 coincides with the circumferential direction of the body portion 12.

The second reinforcement layer 16 is provided at a radial direction outer side of the first reinforcement layer 14 and at an outer surfaces of the pair of caps 20. The second reinforcement layer 16 is configured by carbon fiber-reinforced plastic (CFRP) having plural fibers 78 inside (see FIG. 3). It will be noted that in the drawings the fibers 78 are depicted as being fatter than they actually are in order to show them in a way that is easy to understand, and the fibers 78 are also depicted as being fewer in number than they actually are in order to show the set direction of the fibers 78 in a way that is easy to understand.

As shown in FIG. 3, the fibers 78 of the second reinforcement layer 16 are wound across the axial direction outer end portion 72 of the cap 20. Specifically, the fibers 78 are linearly wound passing through the center portion 28 of the cap 20 and in a range except the projecting portions 30 of the cap 20 as seen in the axial direction. In other words, the fibers 78 are wound passing through geodesics of the axial direction outer end portion 72 of the cap 20. It will be noted that the fibers 78 wound across the axial direction outer end portion 72 of the cap 20 are, as shown in FIG. 1, wound on the first reinforcement layer 14 of the body portion 12 from the one cap 20 inserted into the first end portion of the body portion 12 toward the other cap 20 inserted into the second end portion of the body portion 12 along the axial direction as seen in a direction orthogonal to the axial direction.

Furthermore, the fibers 78 are wound passing through geodesics at the axial direction outer end portion 72 of the other cap 20 in the same way as they are at the one cap 20. Additionally, the fibers 78 are wound on the first reinforcement layer 14 along the axial direction from the other cap 20 inserted into the second end portion of the body portion 12 to the one cap 20 inserted into the first end portion of the body portion 12. The second reinforcement layer 16 is formed by repeating the above process multiple times to form a layer (see the dashed double-dotted line in FIG. 3). Additionally, the second reinforcement layer 16 and the first reinforcement layer 14 are integrated with each other by adding the step of heating and hardening them at the same timing after the fibers 78 have been wound around the body portion 12 and the caps 20. It will be noted that in FIG. 2 the first reinforcement layer 14 and the second reinforcement layer 16 are depicted as separate members in order to show them in a way that is easy to understand.

Action and Effects of Embodiment

Next, the action and effects of the present embodiment will be described.

In the present embodiment, as shown in FIG. 2, the body portion 12 is formed in an open cylindrical shape, at least one end portion of the body portion 12 in the axial direction thereof is open, and the body insertion portion 22 of the cap 20 is inserted inside the end portion to thereby plug the end portion. The first reinforcement layer 14 configured by fiber-reinforced plastic whose fiber direction coincides with the circumferential direction of the body portion 12 is provided on the outer peripheral surface 18 of the body portion 12. Consequently, the pressure resistance of the body portion 12 in its circumferential direction and radial direction is improved.

Additionally, the second reinforcement layer 16 integrated with the first reinforcement layer 14 is provided. The second reinforcement layer 16 is configured by fiber-reinforced plastic in the same way as the first reinforcement layer 14, and the fibers of the second reinforcement layer 16 are disposed passing through the center portion 28 of the cap 20 as seen in the axial direction of the body portion 12. Consequently, even in a case where loads that is directed outward in the axial direction have been input along the axial direction to end portions of the body portion 12, the loads can be received uniformly by the second reinforcement layer 16 and the first reinforcement layer 14 integrated with the second reinforcement layer 16. Furthermore, the fibers 78 of the second reinforcement layer 16 are disposed parallel to the axial direction of the high-pressure tank 10 as seen in a direction orthogonal to the axial direction. That is to say, the fiber direction of the fibers 78 and the axial direction of the high-pressure tank 10 become the same direction, so loads directed outward in the axial direction can be more reliably received by the fibers 78 of the second reinforcement layer 16. For this reason, the pressure resistance in the axial direction of the high-pressure tank 10 itself can be improved. Because of this, the pressure resistance of the high-pressure tank 10 can be improved.

Furthermore, the projecting portions 30 that project outward in the axial direction are provided at the outer peripheral side of the axial direction outer end portion 72 of the cap 20. The fastening hole 74 into which the bolt 50 is inserted and fastened from the outside is provided in one of the projecting portions 30 of the cap 20. The communicative flow path 24 that connects the inside and the outside of the body portion 12 is provided inside the cap 20. The communicative flow path 24 is communicated, via the inside flow path 66 provided inside the bolt 50, with the coupling flow path 48 communicated with the outside of the coupling member 40. For this reason, the fluid inside the high-pressure tank 10 can be supplied to the outside via the projecting portion 30 of the cap 20, and the fluid can be put into the high-pressure tank 10 from the outside. Consequently, it is not necessary to provide the communicative flow path 24 somewhere in the cap 20 outside the projecting portions 30, so more fibers 78 of the second reinforcement layer 16 can be disposed on the part of the cap 20 positioned other than the projecting portions 30. Because of this, the pressure resistance in the axial direction of the high-pressure tank 10 can be further improved.

Moreover, the projecting portions 30 are provided as a pair at the cap 20 across the center portion 28 of the cap 20 as seen in the axial direction of the body portion 12 (see FIG. 3), so the coupling member 40 can be fastened to the cap 20 via the pair of bolts 50 and 52. Consequently, the rigidity of the attachment of the coupling member 40 to the cap 20 can be improved. Because of this, the state of attachment of the coupling member 40 to the cap 20 can be stabilized.

Moreover, the projecting portions 30 are provided at parts positioned outside the center portion 28 of the cap 20, so the fibers 78 of the second reinforcement layer 16 can be disposed so as to pass through the center portion 28 of the cap 20. Consequently, the fibers 78 of the second reinforcement layer 16 can be prevented from sliding on the cap 20 and no longer staying at the cap 20 as a result of the fibers 78 being disposed passing through parts of the cap 20 positioned outside the center portion 28.

Furthermore, the recess portion 32 that opens toward the inside of the body portion 12 and is recessed outward in the axial direction of the body portion 12 is formed in the part of the cap 20 inserted inside the body portion 12. Consequently, the capacity inside the high-pressure tank 10 can be further increased by the recess portion 32.

Moreover, because the recess portion 32 is formed in a substantially domed shape, stress can be prevented from partially concentrating even in a case where a high-pressure fluid is held in the high-pressure tank 10.

It will be noted that although in the embodiment the recess portion 32 provided in the cap 20 is formed in a substantially domed shape, the recess portion 32 is not limited to this and may also be formed in another shape such as an open cylindrical shape.

Furthermore, although the high-pressure tank 10 has a configuration where the caps 20 are inserted inside the first end portion on the one axial direction side and the second end portion on the other axial direction side of the body portion 12, the high-pressure tank 10 is not limited to this and may also have a configuration where a cap 20 is provided at only at least one end portion in the axial direction of the body portion 12.

An embodiment of the present invention has been described above, but the present invention is not limited to what is described above and can be modified and implemented in a variety of ways in addition to what is described above in a range that does not depart from the scope of the claims.

What is claimed is:

1. A high-pressure vessel comprising:
   a body portion formed in an open cylindrical shape, with at least one end portion in an axial direction of the body portion being open;
   a cap, at least a part of the cap being inserted inside an opening of the at least one end portion of the body portion to thereby plug the end portion;
   a first reinforcement layer provided at an outer peripheral surface of the body portion and configured by fiber-reinforced plastic, the fiber-reinforced plastic having an extending direction of internal fibers that coincides with a circumferential direction of the body portion;
   a second reinforcement layer integrated with the first reinforcement layer and configured by fiber-reinforced plastic including fibers that pass through a center portion of the cap, as seen in the axial direction of the body portion, and that are disposed parallel to the axial direction of the body portion, as seen in a direction orthogonal to the axial direction of the body portion;
   a coupling member configured to couple a plurality of the caps to each other; and
   a fastening member, wherein:
   at least a part of each of the plurality of caps is respectively configured to be inserted inside the opening of the at least one end portion of the body portion of each of a plurality of the high-pressure vessels,
   a communicative flow path that connects an inside and an outside of the body portion is provided in each cap,
   a fastening hole is provided inside of each cap, with the coupling member being fastened to the plurality of caps by the fastening member inserted from an outside into the fastening hole, and
   a coupling flow path communicated with an outside of the coupling member is provided inside the coupling member, with the communicative flow path in each cap and the coupling flow path in the coupling member being communicated with each other via an inside flow path provided inside the fastening member.

2. The high-pressure vessel according to claim 1, wherein a projecting portion that projects outward in the axial direction of the body portion is provided at an outer peripheral side of an end portion that is positioned at an outer end of each cap in the axial direction of the body portion, and
   the fastening hole is provided inside the projecting portion, with the coupling member being fastened to the projecting portion by the fastening member inserted from an outside into the fastening hole.

3. The high-pressure vessel according to claim 2, wherein the projecting portion is provided as a pair of projection portions, across the center portion of each cap as seen in the axial direction of the body portion.

4. The high-pressure vessel according to claim 1, wherein a recess portion that opens toward the inside of the body portion and is recessed outward in the axial direction of the body portion is formed in the part of the cap inserted inside the body portion.

5. The high-pressure vessel according to claim 2, wherein a recess portion that opens toward the inside of the body portion and is recessed outward in the axial direction of the body portion is formed in the part of each cap configured to be inserted inside the body portion.

6. The high-pressure vessel according to claim 1, wherein the second reinforcement layer is provided at an outer surface of the first reinforcement layer and at an outer surface of the cap.

7. The high-pressure vessel according to claim 2, wherein the second reinforcement layer is provided at an outer surface of each of first reinforcement layer and at an outer surface of each cap.

8. The high-pressure vessel according to claim 2, wherein the fibers of the second reinforcement layer are wound in an area at the end portion of each cap except an area where the projecting portion is provided.

* * * * *